(12) United States Patent
Jadhav

(10) Patent No.: US 8,356,992 B2
(45) Date of Patent: Jan. 22, 2013

(54) METHOD AND SYSTEM FOR CAPTURING CARBON DIOXIDE IN AN OXYFIRING PROCESS WHERE OXYGEN IS SUPPLIED BY REGENERABLE METAL OXIDE SORBENTS

(75) Inventor: Raja A Jadhav, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 325 days.

(21) Appl. No.: 12/627,967

(22) Filed: Nov. 30, 2009

(65) Prior Publication Data

US 2011/0129408 A1  Jun. 2, 2011

(51) Int. Cl.
*F23G 7/06* (2006.01)
*C10L 10/00* (2006.01)
*B01D 53/62* (2006.01)
*C01G 51/04* (2006.01)
*C01G 45/02* (2006.01)
*C01G 3/02* (2006.01)

(52) U.S. Cl. ........... 431/5; 431/3; 423/220; 423/594.19; 423/604; 423/605; 60/39.464; 60/39.47; 60/39.5; 60/39.52; 60/732

(58) Field of Classification Search .................. 423/220, 423/594.19, 604, 605; 60/39.464, 39.47, 60/39.5, 39.52, 732, 740, 772, 776; 431/3, 431/5
See application file for complete search history.

(56) References Cited

U.S. PATENT DOCUMENTS 5,792,340 A  8/1998 Freel et al.
(Continued)

FOREIGN PATENT DOCUMENTS

EP  2078828 A1  7/2009

OTHER PUBLICATIONS

Adam et al., "Pyrolysis of Biomass in the Presence of A1-MCM-41 Type Catalysts", *Fuel 84*, 2005, pp. 1494-1502, Available online on Mar. 17, 2005.
Li et al., "Experimental Study of $O_2$—$CO_2$ Production for the Oxyfuel Combustion Using a Co-Based Oxygen Carrier", *Industrial & Engineering Chemistry Research*, 2008, Published online on Aug. 27, 2008.

(Continued)

*Primary Examiner* — Daniel C McCracken
*Assistant Examiner* — Daniel Berns
(74) *Attorney, Agent, or Firm* — Richard J. Schulte

(57) ABSTRACT

An oxyfiring system and method for capturing carbon dioxide in a combustion process is disclosed. The oxyfiring system comprises (a) an oxidation reactor for oxidizing a reduced metal oxide; (b) a decomposition reactor wherein a decomposition fuel is combusted and oxidized metal oxide sorbents are reduced with oxygen being released and a flue gas with an oxygen enriched carbon dioxide stream is produced; (c) a fuel combustion reactor for combusting a primary fuel and the oxygen enriched carbon dioxide stream into a primary flue gas; and (d) separation apparatus for separating a portion of the primary flue gas so that a carbon dioxide enriched stream can be prepared. The method comprises providing a primary fuel and an oxygen enriched carbon dioxide stream to a fuel combustion reactor. The primary fuel and oxygen enriched carbon dioxide stream are combusted into a primary flue gas stream which is split into a first flue gas portion and a second flue gas portion. The first flue gas portion is processed to produce a high purity carbon dioxide stream suitable for sequestration. The second flue gas portion is sent to the decomposition reactor to provide heat and serve as a fluid stream. The primary flue gas may include oxygen or else synthesis gas depending on whether the oxygen enriched carbon dioxide stream contains a stoichiometric excess or deficit of oxygen needed for complete combustion.

11 Claims, 2 Drawing Sheets

U.S. PATENT DOCUMENTS

| | | | |
|---|---|---|---|
| 5,961,780 | A | 10/1999 | Kalkanoglu et al. |
| 6,173,663 | B1 | 1/2001 | Balachandran et al. |
| 2005/0175533 | A1 | 8/2005 | Thomas et al. |
| 2008/0176174 | A1 | 7/2008 | White et al. |
| 2009/0253948 | A1 | 10/2009 | McCall et al. |
| 2009/0299112 | A1 | 12/2009 | Bauer et al. |

OTHER PUBLICATIONS

Mattison et al., "Chemical-looping with Oxygen Uncoupling for Combustion of Solid Fuels", *International Journal of Greenhouse Gas Control*, 2009, vol. 3, pp. 11-19, Published online on Jul. 29, 2008.

PCT International Search Report for the International Application No. PCT/US2010/057988, Aug. 18, 2011.

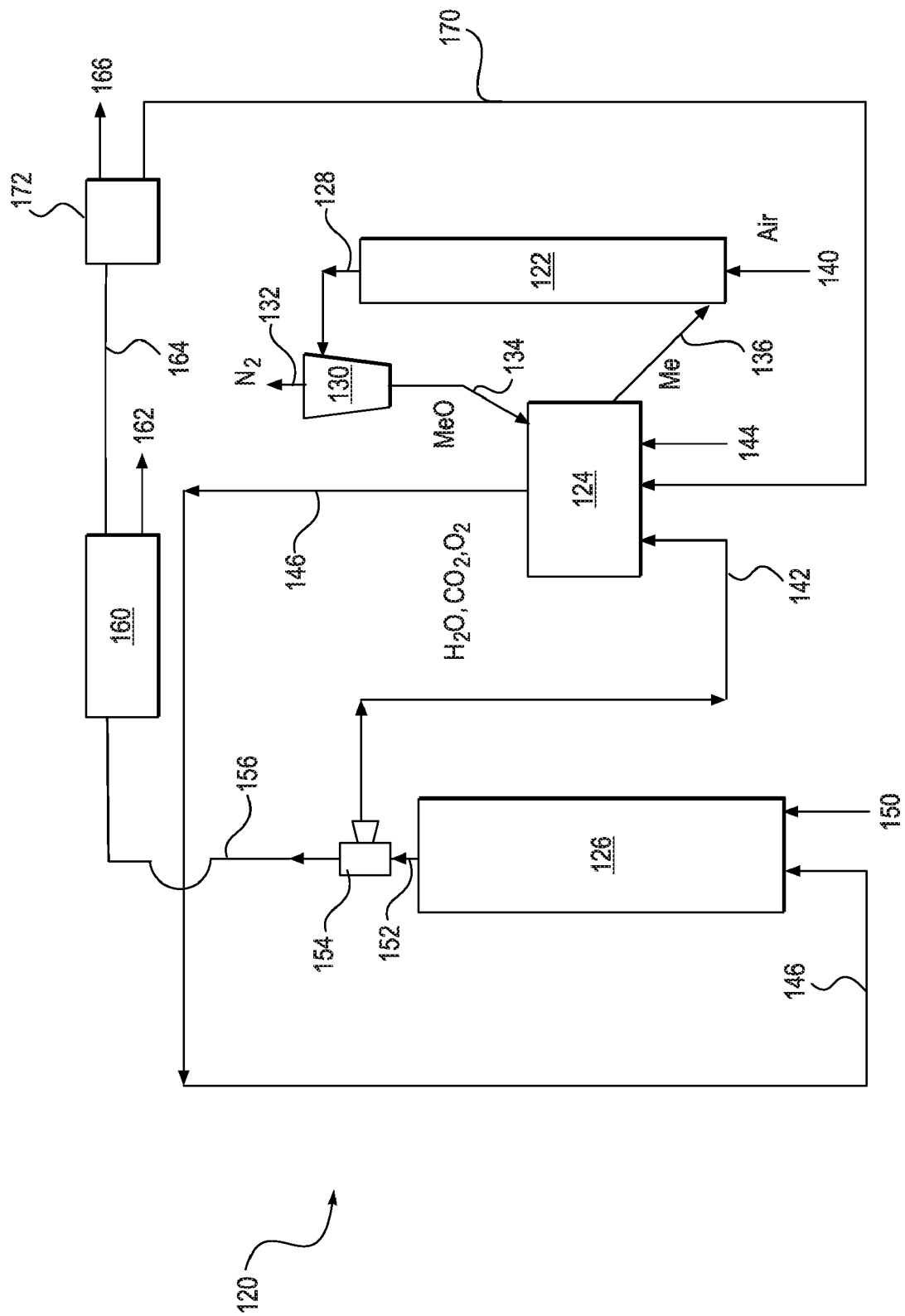

ically high temperature as compared to the same combustion process where air provides the oxygen for combustion. The relatively large quantity of inert nitrogen gas in air keeps the temperature in a combustion reactor at lower temperature as compared to oxyfiring with pure oxygen. In certain instances, this higher temperature may be advantageous. However, conventional combustion reactors, designed to operate at lower temperatures where air and fuel are combusted, can be damaged if they are operated at these higher temperatures. The present invention addresses the need to provide oxyfiring substantially free of nitrogen gas while allowing for the ready retrofit of conventional combustion reactors designed to operate at lower temperatures than would be provided by oxyfiring with a pure stream of oxygen.

METHOD AND SYSTEM FOR CAPTURING CARBON DIOXIDE IN AN OXYFIRING PROCESS WHERE OXYGEN IS SUPPLIED BY REGENERABLE METAL OXIDE SORBENTS

FIELD OF THE INVENTION

The present invention relates generally to oxyfiring, and more particularly, to oxyfiring using regenerable metal oxide sorbents to provide oxygen for combusting a fuel.

BACKGROUND OF THE INVENTION

Oxyfiring or oxy-fuel combustion of fuel in heaters and boilers is a promising carbon dioxide capture process in which fuel is burned generally in the presence of high-purity oxygen, instead of air, to produce heat and a flue gas. Dry air contains roughly (by volume) 78.08% nitrogen, 20.95% oxygen, 0.93% argon, 0.038% carbon dioxide and trace amounts of other gases. Normal air, as compared to dry air, contains a variable amount of water vapor, on average around 1%. The oxyfiring process avoids the need to separate nitrogen gases and other trace gases from the flue gas, which would otherwise be present if air rather than primarily oxygen were burned. Furthermore, the formation of nitrous oxide is avoided or at least substantially reduced with oxyfiring.

The flue gas is composed primarily of carbon dioxide and water vapor with other trace pollutants dependent on the fuel selected. The flue gas can be readily cooled separating out the water and producing a concentrated carbon dioxide stream, which can be further purified to obtain a high-purity carbon dioxide stream. This stream can be sequestered to prevent the release of carbon dioxide into the atmosphere. For example, the carbon dioxide stream may be pumped into a subterranean reservoir. Alternatively, the carbon dioxide may be captured and compressed to a liquid, which can then be sold to industry. Otherwise, the carbon dioxide can be reacted with other chemicals to produce a solid.

Conventionally, one or more cryogenic air separation units (ASU) supplies oxygen for the oxyfiring process. However, the use of ASU systems can be expensive in terms of both upfront capital expenses and ongoing operating expenses.

Another means of providing oxygen for oxyfiring is through the use of ion transport membranes (ITMs). ITMs are generally permeable to oxygen and no other substance and require significantly less energy per unit of oxygen than most conventional methods for producing oxygen. BOC has developed a process to produce an oxygen stream for oxyfuel combustion process using mixed ionic and electronic conductor materials.

Mattisson et al. (*Int. J. Greenhouse Gas Control*, 3, 11-19, 2009) have studied metal oxide sorbents such as manganese oxide ($Mn_2O_3$), copper oxide (CuO) and cobalt oxide ($Co_3O_4$) carried on a carrier substrate for supplying oxygen for the combustion of solid fuels. In their process, known as chemical looping combustion (CLC), fuel and oxidized metal oxide sorbents are placed in intimate contact with each other in a fuel combustion chamber. Oxygen is released from the metal oxide sorbent during combustion with the fuel thus reducing the oxidized metal oxide sorbent. The reduced metal oxide sorbent is then captured and recharged or regenerated with oxygen from air in an appropriate oxidation reactor under suitable conditions. The recharged oxidized metal oxide sorbent is then returned or "looped" to the combustion chamber for combustion with the fuel again.

A flue gas is produced during chemical looping combustion containing carbon dioxide, water vapor, a small amount of oxygen and other gaseous combustion products, depending on the stoichiometric proportions of the fuel and metal oxide sorbents. If the combustion occurs in the presence of a high percentage of oxygen, the combustion can occur at a rela-

SUMMARY OF THE INVENTION

The CLC process described in the background above is generally applicable to "new-built" processes. The invention described here is particularly suitable to existing, "retrofit" applications in which oxygen is supplied by metal oxide sorbents instead of ASU or ITM units. However, newly built systems can also be constructed in accordance with the following disclosure.

An oxyfiring system and method for capturing carbon dioxide in an oxyfiring process is disclosed. The oxyfiring system comprises (a) an oxidation reactor for oxidizing a reduced metal oxide sorbent; (b) a decomposition reactor wherein a decomposition fuel is combusted and an oxidized metal oxide sorbent is decomposed to produce a reduced metal oxide sorbent and oxygen with an oxygen enriched carbon dioxide stream being created within the decomposition reactor; (c) a fuel combustion reactor for combusting a primary fuel and the oxygen enriched carbon dioxide stream into a primary flue gas stream including a stream of carbon dioxide and water vapor; and (d) separation apparatus for separating carbon dioxide from the primary flue gas stream. The primary flue gas stream is separated into a first flue gas portion and a second flue gas portion. The first portion is treated by the separation apparatus to produce a carbon dioxide rich stream which can be sequestered or otherwise utilized. The second flue gas portion can be recycled to provide a carbon dioxide stream to the decomposition reactor. A decomposition reactor refers to a reactor in which an oxidized metal oxide sorbent is reduced through the loss oxygen to a reduced metal oxide sorbent. A decomposition fuel refers to any combustible fuel which can provide heat to the decomposition reactor to enable the decomposition of oxidized metal oxide sorbent.

For the purposes of this specification, the phase "oxygen enriched carbon dioxide stream" refers to a stream of gas wherein there is less than 15% by volume of the nitrogen gas as compared to the total volume of gas in the stream. Accordingly, the primary flue gas stream will not require that nitrogen, or a substantial amount of nitrogen, be removed in efforts to produce an enriched carbon dioxide stream suitable for sequestration from the primary flue gas stream. Similarly, "oxyfiring" refers to combustion in the presence of an oxygen containing stream that is substantially devoid of nitrogen, i.e., less than 15% of nitrogen by volume.

If the oxygen enriched carbon dioxide stream has a stoichiometric excess of oxygen relative to the primary fuel, then the products of the combustion are primarily carbon dioxide, water vapor, some oxygen and other trace gases. However, if there is a stoichiometric deficit of oxygen relative to the primary fuel, then the primary flue gas stream will be comprised of carbon monoxide and hydrogen gas along with the carbon dioxide and water vapor and other trace gases. In this case, the carbon monoxide and hydrogen, i.e. synthesis gas, can be used in the decomposition reactor as the decomposition fuel or in addition to a separate source of decomposition fuel provided to the decomposition reactor.

The method comprises providing a primary fuel and an oxygen enriched carbon dioxide stream to a fuel combustion reactor. The primary fuel and oxygen enriched carbon dioxide stream are combusted into a primary flue gas stream. The carbon dioxide present in the oxygen enriched carbon dioxide stream can be used to assist in controlling the temperature in the combustion reactor. Accordingly, conventional combustion reactor systems that use air as the source of oxygen can be readily retrofit with the present method and system to provide the benefit of producing a flue gas which has very little, if any, nitrogen thereby easing the separation of carbon dioxide from the flue gas.

The primary flue gas is separated into a first flue gas portion and a second flue gas portion, each of which contains the stream of carbon dioxide and water vapor. The first flue gas portion may be further processed or treated to remove water and capture carbon dioxide. If the first glue gas portion also includes a significant amount of synthesis gas, this synthesis gas can be separated from the other gases in the first portion of the flue gas and used as a source of fuel. By way of example and not limitation, the separated synthesis gas could be also be used as a feedstock for other chemical reactions such as in a Fischer-Tropsch reaction to produce hydrocarbon products. If the stream contains significant amounts of oxygen, then this oxygen can be removed from the first gas portion and utilized as an oxidant in the decomposition reactor or elsewhere.

The second flue gas portion, including the carbon dioxide and water vapor, is recycled to the decomposition reactor. The water vapor may be optionally removed to produce a dry stream of gas including the carbon dioxide and other gases, which is then supplied to the decomposition reactor. As described above, the other gases may include oxygen or else synthesis gas, depending upon the stoichiometric amount of oxygen supplied to the combustion reactor to be combusted with the primary fuel. This stream carrying the carbon dioxide is supplied to the decomposition reactor. This stream and oxidized metal oxide sorbents, and a decomposition fuel, if needed for combustion, are combusted in the decomposition reactor to produce a reduced metal oxide, oxygen and a secondary flue gas stream comprising the oxygen enriched carbon dioxide stream and water vapor, which is to be supplied to the combustion reactor. The water vapor may or may not be removed from this secondary flue gas stream prior to being recycled to the combustion reactor. The reduced metal oxide sorbents are then returned to and re-oxidized in the oxidation reactor.

If the stream of carbon dioxide supplied to the decomposition reactor includes excess oxygen, this oxygen can be used to assist in the combustion of the decomposition fuel. If the stream of carbon dioxide supplied to the decomposition reactor includes synthesis gas, then the synthesis gas can be used as the decomposition fuel or to augment a separate source of decomposition fuel. In addition, any oxygen or synthesis gas separated out from the first portion of the primary flue gas stream can be supplied to the decomposition reactor to be used as an oxidant or fuel, respectively.

It is an object of the present invention to provide a decomposition reactor in an oxyfiring system to release oxygen from metal oxide sorbents and combust a fuel to produce a flue gas stream with an oxygen enhanced carbon dioxide stream, substantially free of nitrogen gas. This oxygen enriched flue gas may then be used as an oxidant gas in a combustion reactor to combust with a primary fuel to produce heat and combustion flue gases substantially free of nitrogen. Carbon dioxide can then be readily separated from the combustion flue gases.

BRIEF DESCRIPTION OF THE DRAWINGS

These and other objects, features and advantages of the present invention will become better understood with regard to the following description, pending claims and accompanying drawings where:

FIG. 2 is a second exemplary embodiment wherein the oxygen enriched carbon dioxide stream carries insufficient oxygen to fully combust the primary fuel in the combustion reactor thereby producing a primary flue gas stream that includes synthesis gas, i.e. hydrogen and carbon monoxide. The synthesis gas can then be recycled to the decomposition reactor to be used as a decomposition fuel to produce heat sufficient to create decomposition conditions so that oxygen is released from the oxidized metal oxide sorbents.

DETAILED DESCRIPTION OF THE INVENTION

Figure 1:
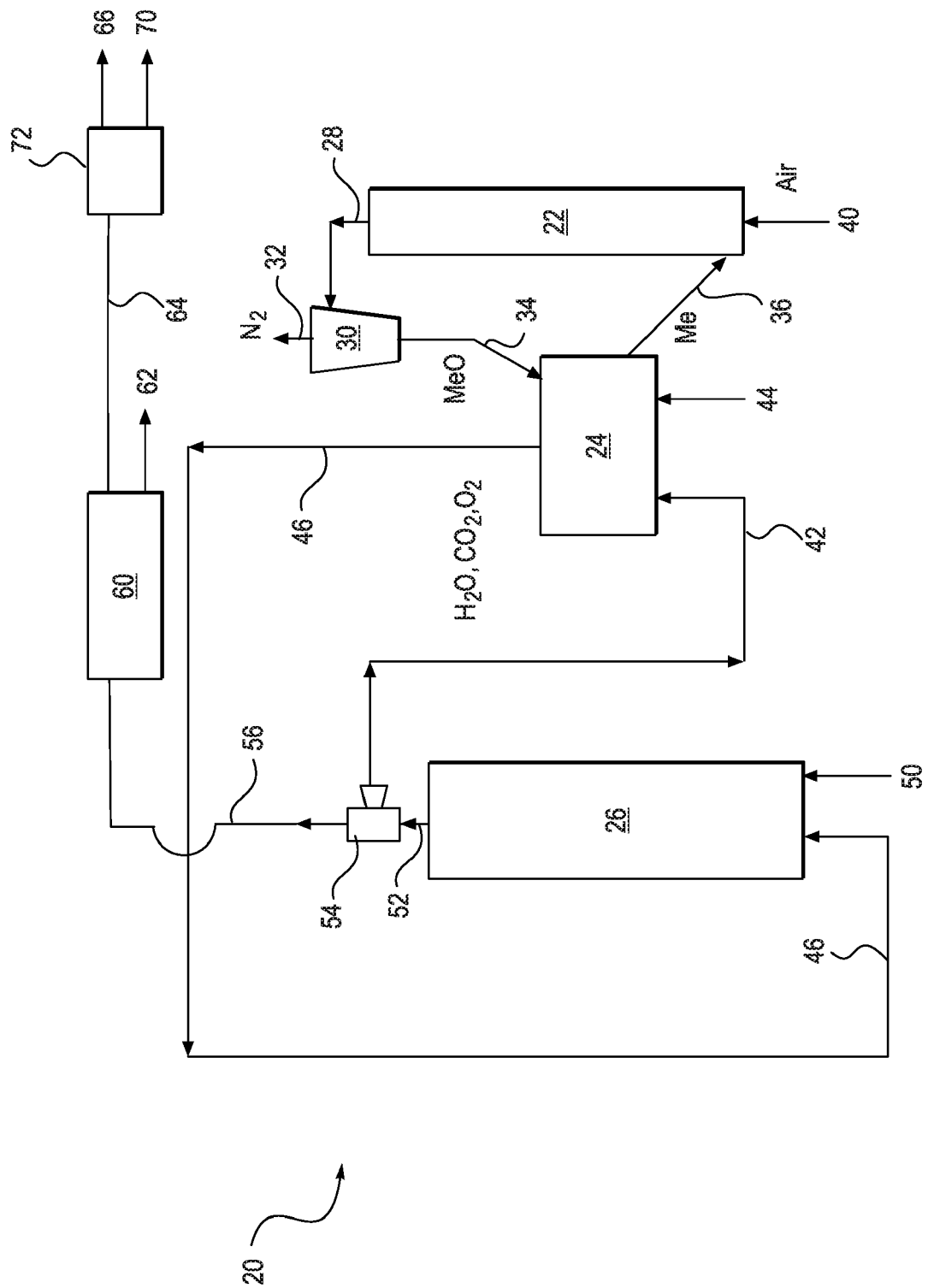
FIG. 1 is a schematic drawing of a first exemplary embodiment of an oxyfiring system including an air reactor, a decomposition reactor and a combustion reactor wherein metal oxide sorbents release oxygen in the decomposition reactor to produce an oxygen enriched carbon dioxide stream, which is supplied to a combustion reactor where the stream is combusted with a primary fuel. The metal oxide sorbents are then regenerated or re-oxidized in an oxidation reactor separating air into oxygen, held by the metal oxide sorbents, and an air stream depleted in oxygen.

An oxyfiring system having at least three reactors is employed to combust a primary fuel and an oxygen enriched carbon dioxide stream to produce heat and a primary flue gas stream which is substantially free of nitrogen. The phrase "substantially free" refers to a flue gas stream having less than 15% by volume of nitrogen gas relative to the other gases in the primary flue gas stream. The oxyfiring system includes a combustion reactor, a decomposition reactor and an oxidation reactor. By controlling the composition of the oxygen enriched carbon dioxide stream, the relative temperature during combustion in the combustion reactor can be controlled. Accordingly, existing combustion reactors, which had previously utilized air as a supply of oxygen, can be retrofitted to operate as an oxyfiring system wherein carbon dioxide can be readily captured from a primary flue gas stream substantially free of nitrogen. Further, because the temperature in the combustion reactor can be controlled, overheating and damage to the combustion reactor can be avoided as compared to using pure oxygen as an oxidant. Increasing the amount of oxygen relative to the amount of carbon dioxide generally correlates to higher operating temperatures for the combustion reactor.

The primary fuel is combusted with the oxygen enhanced carbon dioxide stream in the combustion reactor to produce the primary flue gas stream. Carbon dioxide can be readily captured from the primary flue gas stream as the oxygen enriched carbon dioxide stream used in the combustion reactor is generally devoid of nitrogen. The primary flue gas stream comprises carbon dioxide, water vapor and other gases. The primary flue gas stream is split into a first flue gas portion and a second flue gas portion. From the first portion, water vapor is condensed leaving a stream enriched in carbon dioxide. This carbon dioxide can be separated from the remaining gases into a nearly pure carbon dioxide stream. The carbon dioxide rich gas can then be sequestered, such as in subterranean reservoir, or otherwise utilized. The remaining gases can also be separated if so desired. If the remaining gases contain a substantial amount of oxygen, the oxygen can be captured and used for other purposes. If the remaining gases include a significant amount of synthesis gas, i.e. carbon monoxide and hydrogen gas, the synthesis gas can be used as a fuel for combustion or else as a feedstock for other chemical conversions such as a Fischer-Tropsch conversion into higher order hydrocarbon products.

The decomposition reactor receives and enriches with oxygen the second flue gas portion from the combustion reactor to produce a secondary flue gas stream including the oxygen enriched carbon dioxide stream to be combusted in the combustion reactor. In addition to the second flue gas portion received from the combustion reactor, the decomposition reactor may receive a secondary or decomposition fuel, which is combusted to provide heat to the decomposition reactor. Under the appropriate conditions, the oxidized metal oxide sorbents release oxygen in the decomposition reactor to produce reduced metal oxide sorbents. The released oxygen is used, in part, to combust with the remaining decomposition fuel and, in part, to enrich the carbon dioxide stream from the combustion reactor to produce a secondary flue gas stream including the oxygen enriched carbon dioxide stream and water vapor.

If the stream of carbon dioxide supplied to the decomposition reactor includes excess oxygen, this oxygen can be used to assist in the combusting of the decomposition fuel. If the stream of carbon dioxide supplied to the decomposition reactor includes synthesis gas, then the synthesis gas can be used as the decomposition fuel or to supplement a separate source of decomposition fuel. Also, any oxygen or synthesis gas separated out from the first portion of the primary flue gas stream can also be supplied to the decomposition reactor to be used as an oxidant or fuel, respectively.

The reduced metal oxide sorbents are returned to the oxidation reactor. Air is supplied to the oxidation reactor wherein oxygen is stripped from the air and the reduced metal oxide sorbents are re-oxidized to produce the oxidized metal oxide sorbents that are supplied to the decomposition reactor. The stripped air is depleted in oxygen and is comprised primarily of nitrogen gas and other trace gases, which can be released to the atmosphere. The oxidized metal oxide sorbents are separated from the stripped air and looped back to the decomposition reactor.

Combustion Reactor and Fuel

The combustion reactor can be any reactor wherein a fuel or other source of carbon are combusted, completely or partially, with oxygen. For example, the combustion reactor might be a fired heater or boiler used in power plants or a steam generator or a gas-fired turbine. Alternatively, the combustion reactor might be a coal fired combustion reactor. The combustion reactor could also be a catalyst regenerator in a fluid catalytic cracker (FCC) reactor, in which deposited coke on the catalyst particles is burned off in the presence of oxygen enriched carbon dioxide stream. Those skilled in the art will appreciate that other combustion type reactors that use oxygen may also be utilized and are within the scope of the present invention.

The combustion reactor may be designed to combust any one or more of a number of fuels such as coal, petroleum coke, biomass, char, natural gas, refinery fuel gas, syngas, and other hydrocarbon based fuels. The fuel may be in the form of a gas, a liquid or a solid or even a combination thereof. The solid may be pelletized or otherwise fractured to a suitable particle size.

These fuels are combusted in the presence of the oxygen enriched carbon dioxide stream that provides the oxygen for the combustion reaction. The percentage of oxygen by volume in the oxygen enriched carbon dioxide stream ideally ranges from about 10-50%, or more preferably from about 15-30%, or from about 20-25%. The ideal percentage of oxygen will depend, in part, on the fuel to be combusted and the temperature requirement in the combustion reactor. Also, if it is desired to produce a primary flue gas stream which is rich in syngas rather than oxygen, then stoichiometric calculations may be used to determine the proper amount of oxygen which is to be introduced for combustion with the fuel of choice. The relative level of oxygen or syngas in the primary flue gas stream can also be measured and then the oxygen content of the oxygen enriched carbon dioxide stream can be adjusted to meet the desired composition of the primary flue gas stream. The amount of oxygen in the oxygen enriched carbon dioxide stream can be adjusted, in part, by controlling the amount of oxidized metal oxide sorbents sent to the decomposition reactor. Alternatively, the conditions such as temperature, partial pressure of oxygen and pressure in the decomposition reactor can be controlled to control the amount of oxygen released from the oxidized metal oxide sorbents.

The operating temperature of the combustion reactor is another factor in determining the proper content of oxygen in the oxygen enriched carbon dioxide stream. For example, the combustion reactor may have originally been designed to operate at a relatively lower temperature using air as the oxygen carrying gas for use in combustion. If such a combustion reactor is to be used in a retrofitted oxyfiring system made in accordance with the present invention, then oxygen enriched carbon dioxide stream may require ample carbon dioxide to limit the combustion temperature and prevent damage to the combustion reactor or other temperature sensitive apparatus in the oxyfiring system. Nitrogen carried in air often limits the temperature in conventional air fired combustion reactors as opposed to the present system where little nitrogen gas is contained in the oxygen enriched carbon dioxide stream. The decomposition reactor and oxidation reactor that cooperate to produce the oxygen enriched carbon dioxide stream replaces the standard source of air or oxygen of a conventional combustion system. When a conventional combustion system is retrofitted, for example, the source of the air can be replaced by the decomposition reactor and the oxidation reactor of the present system.

The primary flue gas stream is split downstream from the combustion reactor. Those skilled in the art will appreciate that numerous devices may be used to control the relative amount of flue gas which is split into the first and second flue gas portions. For example, a conduit having an inlet and two outlet orifices of adjustable size openings can be used to adjust the relative amount of flue gas sent out in the first and second flue gas portions.

Decomposition Reactor

The decomposition reactor receives the second flue gas portion from the combustion reactor. Also, the decomposition reactor may receive a second or decomposition fuel so that combustion may take place in the decomposition reactor to provide appropriate conditions, i.e. temperature, for the oxidized metal oxide sorbent to be decomposed into oxygen and the reduced metal oxide sorbent. Water vapor can be removed from the second flue gas portion. Alternatively, the second flue gas portion may contain water vapor when introduced into the decomposition reactor. If the second flue gas portion contains sufficient synthesis gas therein, then no separate supply of a decomposition fuel may be needed. Alternatively, the synthesis gas may be used to supplement a separate decomposition fuel. In the event the second flue gas portion is rich in oxygen and lean in synthesis gas, then the decomposition fuel will be required for combustion to occur in the decomposition reactor. However, if the second flue gas portion is rich in oxygen, the oxygen required to be produced from the oxidized metal oxide sorbents will be lowered.

Mechanically, the decomposition reactor may be any reactor in which gas-solid contact can be achieved. Examples include fixed bed, moving bed, entrained flow and fluidized bed reactors. For reasons of effective gas solid contact and good heat management, a bubbling fluidized bed reactor is preferred as the decomposition reactor.

The oxygen depleted carbon dioxide stream delivered to the decomposition reactor can have a range of percentages of carbon dioxide, oxygen, water vapor, and other impurities. Ideally, the temperature of the second flue gas portion containing the carbon dioxide stream ranges from 100-600° C., more preferably 150-400° C. and even more preferably from 200-300° C. It is desirable to maintain the temperature and heat value of the second flue gas portion as high as possible to facilitate the decomposition reaction of the oxidized metal oxide sorbent. Conduits carrying the second flue gas portion should be minimized in length and insulated to prevent heat loss.

A number of fuels may be utilized for combustion in the decomposition reactor. These fuels may be in gas, liquid or solid form or a combination thereof. With respect to gas, the fuel may be the synthesis gas as previously described, natural gas, refinery gas, or a combination of the above or other combustible hydrocarbon containing gases. Examples of liquids, without limitation, may include fuel oil, bunker fuel, and kerosene. Solids, ideally pelletized or otherwise ground up to provide small particles sizes, may also be used and include, by way of example and not limitation, coal, char, wood and charcoal.

In one embodiment, the combustion reactor may be operated in oxygen deficient mode, thus preventing complete combustion of the primary fuel. The primary flue gas thus may contain carbon monoxide and hydrogen, which can be used as the decomposition fuel in the decomposition reactor. Additionally, carbon monoxide and hydrogen separated from the first portion of the flue gas stream in the carbon dioxide purification process may also be used as a supplementary fuel in the decomposition reactor.

Certain solids react with oxygen to form oxidized metal oxide sorbents and decompose when heated to produce reduced metal oxide sorbents and gaseous oxygen. The metal oxide sorbents to be used in the oxyfiring system may include any one of a number of metal particles supported on a substrate that can be readily oxidized and reduced, depending on the temperature and oxygen partial pressure. Typical operating conditions in the decomposition reactor include temperatures ranging from about 600-1100° C. Pressure may be in the range of 1-25 bara, and more preferably 1-4 bara.

By way of example and not limitation, examples of such metal oxide sorbents are shown in Table 1.

TABLE 1

Metal Oxide Sorbents

| Base Metal | Reduced Metal Oxide Sorbent | Oxidized Metal Oxide Sorbent | Typical Decomposition Temperature in the Presence of Air, ° C. |
|---|---|---|---|
| Cu | $Cu_2O$ | $CuO$ | 1030 |
| Mn | $Mn_3O_4$ | $Mn_2O_3$ | 900 |
| Co | $CoO$ | $Co_3O_4$ | 890 |

Exemplary, reversible decomposition reactions are shown below for $CuO/Cu_2O$, $Mn_2O_3/Mn_3O_4$ and $Co_3O_4/CoO$ metal oxide sorbents;

$$4CuO \leftrightarrow 2Cu_2O + O_2(g) \tag{1}$$

$$6Mn_2O_3 \leftrightarrow 4Mn_3O_4 + O_2(g) \tag{2}$$

$$2Co_3O_4 \leftrightarrow 6CoO + O_2(g) \tag{3}$$

Mattisson et al. (*Int. J. Greenhouse Gas Control*, 3, 11-19, 2009) and the disclosure therein is hereby incorporated by reference in its entirety which describes the uses of metal oxide sorbents oxidized in an air reactor with oxygen being supplied to a reactor where oxygen is released from the metal oxide sorbents.

A number of substrates may be used to support the metal oxide sorbents. Non-limiting examples of such substrates include alumina, silica, aluminosilica, titania, zirconia, and their combinations. These supports provide high surface area to the metal oxide and improve attrition and sintering characteristics of the metal oxides. They also act as heat storage medium.

Metal oxide sorbents including the metal oxides supported on these substrates can be prepared by techniques well known in the literature, such as wet impregnation, freeze granulation, solids mixing, or spray drying. During the preparation, a portion of the metal oxide may react irreversibly with the support forming an additional compound. The amount of metal oxide on the prepared sorbent ideally ranges from about 5-60 wt %, or more preferably from about 10-50 wt %.

The operating temperature of the decomposition reactor will depend, in part, on the particular metal oxide sorbent which is to be utilized to deliver oxygen to the decomposition reactor. For example, typical decomposition temperatures for each of the aforementioned metal oxide sorbents in the presence of air are listed in Table 1 above.

The decomposition reactor is ideally a bubbling fluidized bed reactor. Decomposition fuel, if needed, and the second flue gas portion are introduced into the bottom of the decomposition reactor. The oxidized metal oxide sorbent from the oxidation reactor is introduced into the flow of the fuel and second flue gas portion. Under conditions of low partial pressure of oxygen and high temperature in the decomposition reactor, the oxidized metal oxide sorbents release oxygen into the flow with a portion of the released oxygen combusting with the decomposition fuel and another portion of the released oxygen enriching the second flue gas portion to create a secondary flue gas stream including the oxygen enriched carbon dioxide stream and water vapor. Typically, the carbon dioxide does not participate in the decomposition reaction. Any solids entrained in the secondary flue gas stream are separated and returned to the decomposition reactor using a cyclone, which could be internal or external to the decomposition reactor.

Oxidation Reactor

The reduced metal oxide sorbents are returned from the decomposition reactor to the oxidation reactor by gravity or other means such as a screw feeder to be re-oxidized into the oxidized metal oxide sorbents. Most preferably, the oxidation reactor is a riser reactor that has a large tube height/diameter ratio as compared to the fluidized bed reactor serving as the decomposition reactor. The velocity of the fluid flowing through the oxidation reactor is generally much higher than that flowing through the decomposition reactor. High-velocity air carries the reduced metal oxide sorbents to the top of the oxidation reactor. During the travel through the oxidation reactor, oxygen is captured by the reduced metal oxide sorbents to create the oxidized metal oxide. Typical operating conditions in the oxidation reactor include temperature ranging from 600 to 1100° C. Pressure may be in the range of 1-25 bara, and more preferably 1-4 bara.

The air is stripped of oxygen leaving an oxygen depleted air stream. This stream and the oxidized metal oxide sorbents are sent to a separator, such as a cyclone, where the heavier oxidized metal oxide sorbents are separated from the oxygen depleted air stream. The oxygen depleted air stream may be released to the atmosphere while the oxidized metal oxide sorbents are looped back to the decomposition reactor, ideally assisted by gravity. Loop-seals and pot-seals are typically used to prevent inter-mixing of gases between the decomposition and oxidation reactors.

Detailed Description of FIG. 1

FIG. 1 shows schematic drawing of a first embodiment of an oxyfiring system 20 made in accordance with the present invention. The system is particularly well suited to retrofit conventional combustion reactors which utilize air as a supply of oxygen for the combustion of fuel. System 20 comprises three main reactors: an oxidation reactor 22, a decomposition reactor 24 and a fuel combustion reactor 26.

Oxidation reactor 22, using air 40 as a source of oxygen, oxidizes reduced metal oxide sorbents to oxidized metal oxide sorbents. A stream 28 of air stripped of oxygen and the oxidized metal oxide sorbents are sent to a cyclone separator 30 where the oxidized metal oxide sorbents and oxygen depleted air stream 32 are separated. A supply stream 34 of the oxidized metal oxide sorbents (shown as MeO stream in FIG. 1) is sent to the decomposition reactor 24. The stream 34 may also contain some reduced form of metal oxide sorbents that did not undergo complete oxidation in oxidation reactor 22. By way of example, and not limitation, the oxidized metal oxide sorbents may include one or more of CuO, $Mn_2O_3$ or $Co_3O_4$ or a combination thereof or other suitable oxygen carrying materials supported on a substrate such as alumina, silica, aluminosilica, titania, and zirconia. The oxidized metal oxide sorbents must have the ability to release oxygen in decomposition reactor 24 under the appropriate conditions, such as those listed in Table 1.

Decomposition reactor 24 allows oxidized metal oxide sorbents supplied in fluid supply stream 34 to be decomposed or reduced into oxygen and reduced metal oxide sorbents. The reduced metal oxide sorbents (denoted as Me in FIG. 1) are returned to oxidation reactor 22 in a return stream 36. The stream 36 may also contain some oxidized form of metal oxide sorbents that did not undergo complete reduction in decomposition reactor 24. The reduced metal oxide sorbents are oxidized back into the oxidized metal oxide sorbents in oxidation reactor 22 in the presence of air 40 that is supplied to the oxidation reactor 22. Thus the metal oxide sorbents loop back and forth between oxidation and decomposition reactors 22, 24 to separate oxygen from air and then deliver the oxygen to the decomposition reactor 24.

A second flue gas portion 42, along with a decomposition fuel 44, is combusted in decomposition reactor 24. Water vapor in second flue gas portion 42 may be removed by cooling and condensation prior to entering decomposition reactor 24, if so desired. The operating temperature of the two reactors 22, 24 depends on the thermodynamics of the reversible reactions such as those given above in equations (1)-(3) and in general range from about 600-1100° C. for most metal oxides sorbents. The second flue gas portion 42 from combustion reactor 26 may contain a small amount of oxygen so that decomposition fuel 44 can be combusted in decomposition reactor 24 to supply the necessary heat to accommodate the decomposition reaction. Oxygen released from oxidized metal oxide sorbents is partially used in the combustion of decomposition fuel 44 and is partially used to enrich the second flue gas portion 42 creating a secondary flue gas stream which includes oxygen enriched carbon dioxide stream 46 comprising primarily carbon dioxide, water vapor and oxygen.

A primary fuel 50 and oxygen enriched carbon dioxide stream 46 are introduced into combustion reactor 26 where primary fuel 50 is combusted. For example, fuel 50 could be natural gas or methane. If a stoichiometric excess of oxygen is supplied to combustion reactor 26, then primary flue gas stream 52 comprises water vapor, carbon dioxide, oxygen, and other trace gases. Oxygen depleted carbon dioxide stream 52 comprises on the order of 40-60% carbon dioxide, 40-60% water vapor and the remainder consisting of oxygen and other trace gases. A splitter 54 is used to split stream 52 into first flue gas portion 56 and second flue gas portion 42 that serves to provide a hot fluid stream to decomposition reactor 24. Again, stream 42 can have water removed there from to produce a dry stream, if so desired.

If a stoichiometric deficit of oxygen is supplied to combustion reactor 26, then primary flue gas 52 will include synthesis gas rather than excess oxygen. In this instance, the synthesis gas can be used as the decomposition fuel 44 or else to supplement a separate decomposition fuel 44 to be introduced into decomposition reactor 24.

First flue gas portion 56 is sent to a condenser 60 where water 62 is condensed out of the first flue gas portion 56. The remaining carbon dioxide and oxygen fluid stream 64 is then separated into primarily carbon dioxide stream 66 and stream 70 containing oxygen and other gases using standard gas separation apparatus 72 and processes for separating carbon dioxide from other gases. By way of example and not limitation, such apparatus can include refrigeration, membranes, and absorption media that are well known to those skilled in the art of gas separation. Ideally, carbon dioxide stream 66 is at least 95% pure or more and can be geologically sequestered or otherwise utilized. Although not shown in FIG. 1, a portion of stream 70 containing oxygen and other trace gases may be sent to decomposition reactor 24 as an oxidant.

The second flue gas portion 42 is routed back to decomposition reactor 24 to again be enriched with oxygen. Note that system 20 keeps the metal oxide sorbents separated from the primary fuel combusted in the combustion reactor. This is particularly advantageous for retrofit applications, where it is easier to send an oxygen containing gas to the combustion reactor rather than solid metal oxide sorbent.

FIG. 2 shows a second embodiment of an oxyfiring system 120 wherein synthesis gas from both first and second flue gas portions are combusted in a decomposition reactor 124. Similar and corresponding elements from that described in the first embodiment of FIG. 1 have reference numerals incremented by 100 In this second embodiment, the combustion reactor 126 may be operated in an oxygen deficient mode, thus preventing complete combustion of the primary fuel 150. That is, there is an insufficient amount of oxygen in oxygen enriched carbon dioxide stream 146 to fully combust primary fuel 150. The primary flue gas 152 thus may contain carbon monoxide and hydrogen in addition to carbon dioxide and water vapor. Second flue gas portion 142 therefore can be used as part of the decomposition fuel in the decomposition reactor 124. First flue gas portion 156 again has water 162 removed using a water condenser 160. The remaining gas 164 can be separated using conventional gas separation apparatus 172 into a stream 166 containing high purity carbon dioxide and a stream 170 of synthesis gas, i.e., the carbon monoxide and hydrogen gas and other gases. The synthesis gas stream 170 can then be routed to decomposition reactor 124 for use as part of the decomposition fuel. A portion of the stream 170 may be vented to the atmosphere to avoid build-up of inert gases in the system (not shown in FIG. 2).

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method of capturing carbon dioxide in a combustion process comprising the steps of:
   (a) providing a primary fuel and an oxygen enriched carbon dioxide stream to a primary fuel combustion reactor where the primary fuel and the oxygen enriched carbon dioxide stream are combusted to produce heat and a primary flue gas stream including water and a carbon dioxide stream;
   (b) splitting the primary flue gas stream into a first flue gas portion and a second flue gas portion;
   (c) supplying the second flue gas portion, a decomposition fuel and an oxidized metal oxide sorbent to a decomposition reactor where the oxidized metal oxide sorbent is decomposed to a reduced metal oxide sorbent and oxygen, and the decomposition fuel is combusted with a portion of the oxygen to produce a secondary flue gas stream including the oxygen enriched carbon dioxide stream to be used in step (a);
   (d) transferring the reduced metal oxide sorbent to an oxidation reactor where, in the presence of air, the reduced metal oxide sorbent is re-oxidized into the oxidized metal oxide sorbent to be used in step (c); and
   (e) capturing carbon dioxide from the first flue gas portion.

2. The method of claim 1 wherein:
the oxygen enriched carbon dioxide stream has a stoichiometric deficit of oxygen relative to the primary fuel such that the primary flue gas stream includes carbon dioxide, water vapor, carbon monoxide and hydrogen gas.

3. The method of claim 2 wherein:
the second flue gas portion includes the carbon monoxide and hydrogen gas and the carbon monoxide and hydrogen gas are used as the decomposition fuel in the decomposition reactor.

4. The method of claim 2 wherein:
the second flue gas portion includes the carbon monoxide and hydrogen gas and the carbon dioxide and hydrogen gas are combusted along with the decomposition fuel in the decomposition reactor.

5. The method of claim 2 wherein:
the first flue gas portion includes carbon monoxide and hydrogen gas; and
the carbon monoxide and hydrogen gas are separated from the first flue gas portion and are combusted in the decomposition reactor.

6. The method of claim 1 wherein:
the oxygen enriched carbon dioxide stream has a stoichiometric excess of oxygen such that the primary fuel is fully combusted in the combustion reactor producing the primary flue gas of carbon dioxide and water vapor and further including oxygen.

7. The method of claim 1 wherein:
the oxidized metal oxide sorbent is selected from the group consisting of one or more of a copper oxide ($CuO$), manganese oxide ($Mn_2O_3$) or cobalt oxide ($Co_3O_4$) carded on a substrate.

8. The method of claim 7 wherein:
the substrate is selected from the group of consisting of one or more of alumina, silica, aluminosilica, titania, and zirconia.

9. The method of claim 1 wherein:
the oxygen enriched carbon dioxide stream has a stoichiometric deficit of oxygen relative to the primary fuel.

10. The method of claim 1 wherein:
the oxygen enriched carbon dioxide stream has a stoichiometric excess of oxygen relative to the primary fuel.

11. The method of claim 1 wherein:
the decomposition reactor is maintained at a temperature between 600-1100° C.

* * * * *